United States Patent [19]
Borth et al.

[11] Patent Number: 5,271,042
[45] Date of Patent: Dec. 14, 1993

[54] SOFT DECISION DECODING WITH CHANNEL EQUALIZATION

[75] Inventors: David F. Borth, Palatine; Gerald P. Labedz, Chicago; Phillip D. Rasky, Buffalo Grove, all of Ill.

[73] Assignee: Motorola, Inc., Schaumburg, Ill.

[21] Appl. No.: 422,177

[22] Filed: Oct. 13, 1989

[51] Int. Cl.$^5$ .............................................. H04L 1/00
[52] U.S. Cl. ...................................... 375/101; 375/96; 371/43; 364/724.11
[58] Field of Search ............... 375/18, 58, 96, 99, 375/101, 103, 102; 371/43; 364/724.11; 455/296, 312, 303, 305

[56] References Cited

U.S. PATENT DOCUMENTS

| | | | |
|---|---|---|---|
| 2,982,852 | 5/1961 | Fano | 375/58 |
| 3,003,030 | 10/1961 | Oshima et al. | 375/58 |
| 3,356,947 | 12/1967 | Toro | 375/58 |
| 3,484,693 | 12/1969 | Fong | 375/58 |
| 4,025,719 | 5/1977 | Nussbaumer | 375/99 |
| 4,312,072 | 1/1982 | Vogel | 375/103 |
| 4,484,338 | 11/1984 | Clark et al. | 375/94 |
| 4,631,735 | 12/1986 | Qureshi | 375/99 |
| 4,644,564 | 2/1987 | Dolivo et al. | 375/102 |
| 4,748,626 | 5/1988 | Wong | 375/17 |
| 4,829,543 | 5/1989 | Borth et al. | 375/96 |
| 4,852,090 | 7/1989 | Borth | 375/101 |
| 4,885,757 | 12/1989 | Provence | 364/807 |
| 4,905,254 | 2/1990 | Bergmans | 375/101 |
| 4,949,396 | 8/1990 | Chung | 455/303 |

OTHER PUBLICATIONS

David Chase, "A Class of Algorithms for Decoding Block Codes With Channel Measurement Information", *IEEE Transactions on Information Theory*, vol. IT-18, No. 1, Jan. 1972, pp. 170-182.

Jerrold A. Heller and Irwin Mark Jacobs, "Viterbi Decoding for Satellite and Space Communication", *IEEE Transactions on Communication Technology*, vol. COM-19, No. 5, Oct. 1971, pp. 835-848.

Shu Lin and Daniel J. Costello, Jr., "Error Control Coding: Fundamentals and Applications", ©1983, pp. 341-345.

Tadashi Matsumoto, "Soft Decision Decoding of Block Codes Using Received Signal Envelope in Digital Mobile Radio", *IEEE Journal on Selected Areas in Communications*, vol. 7, No. 1, Jan. 1989, pp. 107-113.

Ekemark et al., "Modulation and Channel Coding in Digital Mobile Telephony", *Nordic Seminar on Digital Land Mobile Radiocommunication*, Espoo, Finland, Feb. 5-7, 1985, pp. 219-227.

Gottfried Ungerboeck, "Adaptive Maximum-Likelihood Receiver for Carrier-Modulated Data-Transmission Systems", *IEEE Transactions on Communications*, vol. COM-22, No. 5, May 1974, pp. 624-636.

D'Avella et al., "An Adaptive MLSE Receiver for TDMA Digital Mobile Radio", *IEEE Journal on Selected Areas in Communications*, vol. 7, No. 1, Jan. 1989, pp. 122-129.

*Primary Examiner*—Curtis Kuntz
*Assistant Examiner*—Young Tse
*Attorney, Agent, or Firm*—Raymond J. Warren

[57] ABSTRACT

In a communications network having time-dispersed signals, there is provided a mechanism for soft decision decoding. It comprises: radio reception of a time-dispersed signal, at least partly equalizing those time-dispersal effects, recovering information contained in the signal, multiplying with that recovered information the absolute value of that at-least-partly-equalized signal (scaled by a number derived from channel conditions over a time during which at least part of the information to be recovered is distributed), and error-correcting the multiplied information by a Viterbi algorithm channel decoding scheme of error correction. Accordingly, soft decision information is generated from within the equalization process itself.

20 Claims, 1 Drawing Sheet

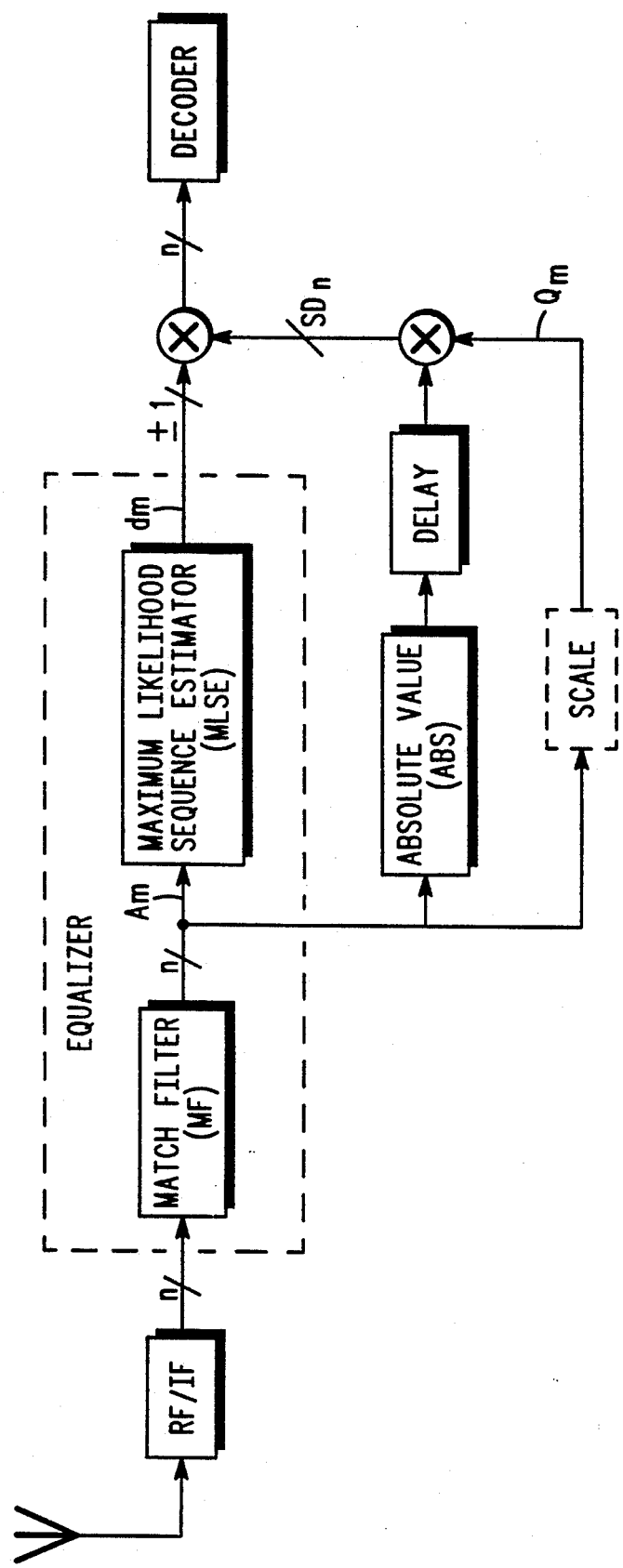

SOFT DECISION DECODING WITH CHANNEL EQUALIZATION

THE FIELD OF THE INVENTION

This invention is concerned with soft decision decoding.

More particularly, in a communications network having time-dispersed signals, this invention is concerned with soft decision decoding during equalization.

This invention is particularly concerned with deciding at a receiver which of a predetermined set of symbols was transmitted, by using an error correction or detection decoder operating on a recovered signal having a number of possible values greater than the number of symbols in the set—called soft decision decoding. More particularly, in a communications network having time-dispersed signals, this invention is concerned with soft decision decoding using information derived during equalization.

BACKGROUND OF THE INVENTION

In digital transmission over a medium vulnerable to corruption, such as a fading radio channel, convolutional error correction coding is used to distribute transmitted information over time such that it can still be reconstructed, despite some corruption. An error correction decoding technique, such as Viterbi algorithm channel decoding, is used to reconstruct the originally-transmitted information from the corrupted signal.

In a digital radiotelephone system, high data rate digital radio transmissions encounter serious intersymbol interference (ISI) due to multiple reflections and echoes off buildings and other objects in the transmission path. The ISI is especially sever in severely delay-spread channels where the various reflections arrive at the receiver delayed by amounts comparable to a significant fraction of a symbol time. Thus, adaptive equalization—attempting to account for these multipath, time-dispersal effects on the signal and realign the echoes in time—is employed prior to error correction or detection. The problem is that equalization attempts to distill the information carried in the composite, multipath signal to a definitive decision about each symbol received—a "hard decision". For example, in the binary case, where one of only two symbols can be sent, the output of the equalizer can only take on one of two values, these values being referred to as the equalizer's hard decisions.

It is well recognized that better decisions can be made about the value of any individually-transmitted symbol with the availability of "soft information". That is, if during error correction, it were known to the decoder what the quality of the signal was when the symbol was received, a better decision could ultimately be made about what the true value of the transmitted symbol really was. This soft information represents a measure of the confidence held in any given symbol detection. But any such soft information has ordinarily been removed by equalization.

Conventional wisdom dicates that soft information be developed at or ahead of the radio demodulator (at the RF, IF or discriminator stage), at a point that is rich in signal quality information (signal strength, noise and distortion). See, for example, FIG. 6 of Tadashi Matsumoto, "Soft Decision Decoding of Block Codes Using Received Signal Envelope in Digital Mobile Radio", *IEEE Journal on Selected Areas in Comm.*, Vol. 7, No. 1, January 1989, or "Modulation and Channel Coding in Digital Mobile Radio Telephony", *Proceedings of the Nordic Seminar on Digital Land Mobile Radiocommunication*, Espoo, Finland, 5–7 February, 1985, pp. 219–227. Yet it is not widely recognized that the composite signal envelope yields erroneous information in the severely delay-spread channel. This may possibly be due to the phenomenon of individual signal paths causing rapid signal envelope changes (hereinafter coined "microfading"), changes taking place much more rapidly than is known for conventional Rayleigh fading at a given receiver speed.

This invention takes as its object to overcome these shortcomings and to realize certain advantages presented below, and exploits the recognition that fading, microfading and intersymbol interference make the composite signal envelope a poor choice for developing soft information.

SUMMARY OF THE INVENTION

In a communications network having time-dispersed signals, there is provided a mechanism for soft decision decoding. It comprises: radio reception of a time-dispersed signal, at least partly equalizing those time-dispersal effects, recovering information contained in the signal, multiplying with that recovered information the absolute value of the at-least-partly-equalized signal (scaled by a number obtained from signals during which at least part of the information to be recovered is distributed), and error-correcting the multiplied information by a Viterbi algorithm channel decoding scheme of error correction. Accordingly, soft decision information is generated from within the equalization process itself.

DESCRIPTION OF THE DRAWING

Additional objects, features and advantages of the invention will be more clearly understood and the best mode contemplated for practicing it in its preferred embodiment will be appreciated (by way of unrestricted example) from the following detailed description, taken together with the accompanying drawing in which:

The figure is a block diagram of the preferred embodiment of the invention.

DETAILED DESCRIPTION

The single FIGURE is a block diagram of the preferred embodiment of the invention. It illustrates, coupled in series, a radio having a receiver (RF/IF), equalizer (EQ) and channel decoder (DECODER); the receiver has radio frequency (RF), intermediate frequency (IF) and demodulation (DEMOD) stages, and the equalizer (EQ) has a channel matched filter (MF) and a maximum likelihood sequence estimator (MLSE), all of which are well understood by those ordinarily skilled in this field (see G. Ungerboeck, "Adaptive Maximum-Likelihood Receiver for Carrier-Modulated Data-Transmission Systems", *IEEE Trans. Comm.*, Vol. COM-22, No. 5, May 1974, pp. 624–636, and FIG. 2 of D'Avella, Moreno & Sant'Agostino, IEEE Journal on Selected Areas in Comm. Vol. 7, No. 1, January, 1989, pp. 122–129). A complex synchronization correlator (not unlike U.S. Pat. Nos. 4,829,543 and 4,852,090, both assigned to Motorola) provides the coefficients for the matched filter (MF).

Conventionally, a radio frequency digital signal exhibiting delay-spread characteristics is received, converted to an intermediate frequency and demodulated into n samples per symbol. The matched filter (MF) is matched to the multipath channel characteristics and approximately accounts for and realigns the multipath echoes while the MLSE makes "hard" ($\pm 1$) one-symbol-at-a-time decisions about the symbol received. Ordinarily, the Viterbi algorithm channel decoder (DECODER) would attempt to perform error correction on the hard decisions and decode the transmitted information.

Rather than following conventional wisdom and developing soft decision information from the composite signal envelope in the radio demodulator, the confidence information is developed after the effects of fading, microfading, multipath and intersymbol interference have been at least partly accounted for by channel matched filtering. This altered signal is now more reliable than the composite signal envelope in that some of the undesirable characteristics of the composite envelope have been removed through matched filtering. Accordingly, the hard decision output of the MLSE ($\pm 1$ in the preferred embodiment) is weighted (multiplied) by the absolute value (ABS) of the matched filter (MF) output, suitably delayed to account for the processing time of the MLSE (DELAY) to provide soft information on which better error correction evaluations can be made in the Viterbi algorithm channel decoder (DECODER). The absolute value of the matched filter output is taken so that the MLSE's decisions are multiplied only by the magnitude, and not the sign, of the sample being output by the matched filter (MF). That is, the MLSE's output decisions are weighted by a measure of reliability for each of those decisions, the reliability in this case being taken as the amplitude of the input to the MLSE at a given symbol sample time.

Added improvement is obtained by progressively scaling (SCALE) the absolute value for the current transmission by the average of the current transmission strength and the strength of the signal in the recent past. In the next generation digital cellular system for Europe, a digitized speech block of 260 bits is coded, reordered and diagonally interleaved over eight TDMA bursts. The MLSE hard decisions ($\pm 1$) for each burst are weighted by the soft decision information $SD_n$, which includes a factor for the average of the averages of the absolute values of the matched filter outputs for the current burst and several previous bursts. This is calculated by the following method. If for a given burst m there are N symbols to be decided upon by the MLSE (N=114 in the preferred embodiment), then decoded, at the rate of one sample per symbol at the output of the matched filter, a particular sample can be designated as $x_{mn}$ where $n=1, \ldots, N$. At the end of processing each burst through the matched filter, an average $A_m$ is formed $$A_m = \sum_{n=1}^{N} |x_{mn}|/N$$

A number M of these averages can then be averaged, giving $Q_m$ according to $$Q_m = \left( \sum_{j=m-(M-1)}^{m} A_m \right)/M$$

for the burst m. If the MLSE hard decisions for a burst m are given by $d_n$, $n=1, \ldots, N$ then the soft decision information passed to the convolutional decoder for each of the samples would be $$SD_n = d_n X |x_{mn}|/Q_m$$

The factor $Q_m$ has the effect of accentuating samples of especially weak bursts and symbols on a faded channel, making their soft decision values even lower than in the non-scaled case. The length of time the scaling factor $Q_m$ represents can be a variable. The preferred embodiment is for a burst-oriented processing in a Time Division Multiple Access (TDMA) system, and it has been found that M=8 can produce an improvement over the case where no scaling at all is used. However, using no scaling at all, $Q_m = 1$, still produces an improvement over merely using the MLSE's hard decisions $d_n$ in the Viterbi algorithm convolutional decoder. It would not be necessary, however, to restrict the present invention to burst-oriented TDMA systems. In a continuous-time Frequency Division Multiple Access (FDMA) radio transmission system, training and synchronizing could take place at some interval, whether a specific pattern of symbols is used or not. As this training adjusts the transfer function of the matched filter, the output could still be used as in the equations above as soft decision information, multiplying the hard decision of the MLSE by the corresponding absolute value of the matched filter output. If scaling is to be performed, it could be done as a running average, over some appropriate time, of the absolute value of the matched filter outputs.

The attendant advantages of this invention include computational simplicity while developing reliable soft decision information from within the equalization process itself.

Better performance yet might be achieved by using the MLSE branch metrics (scaled as above) instead of the MF output to develop the soft information. This might involve taking the metric computation at each state transition (say equation 31 or 32 of Ungerboeck, cited earlier) and multiplying it by the output hard decision for which symbol was transmitted at that time. This is still, in effect, attaching a confidence factor to each of the MLSE's hard decisions.

Thus, in a communications network having time-dispersed signals, there has been provided a mechanism for soft decision decoding. It comprises: radio reception of a time-dispersed signal, at least partly equalizing those time-dispersal effects, recovering information contained in the signal, multiplying with that recovered information the absolute value of that at-least-partly-equalized signal (scaled by a number obtained from current conditions and past history), and error-correcting the multiplied information by a Viterbi algorithm channel decoding scheme of error correction. Accordingly, soft decision information is generated from within the equalization process itself.

While the preferred embodiment of the invention has been described and shown, it will be appreciated by those skilled in this field that other variations and modifications of this invention may be implemented. For example, the instant invention is not limited to these particular (matched) filters, (maximum likelihood) sequence estimators or (Viterbi algorithm channel decoder) error correctors; it may be advantageous with decision feedback equalizers, for instance.

These and all other variations and adaptations are expected to fall within the ambit of the appended claims.

What we claim and desire to secure by Letters Patent is:

1. A method of soft decision decoding comprising the steps of:
   receiving a time-dispersed signal,
   recovering information, having a time-dispersal effect, contained in the time-dispersed signal,
   accounting for the time-dispersal effect of the recovered information,
   weighting the recovered information using a weight comprising an absolute value of the received time-dispersed signal,
   and evaluating the recovered information considering the weight given thereto.

2. A method as claimed in claim 1 above, wherein accounting for those time-dispersal effects and recovering information comprises equalization.

3. A method as claimed in claim 1 above, wherein the step of accounting for the time-dispersal effects comprises the step of equalizing a plurality of multipath time-dispersal effects.

4. A method as claimed in claim 1 above, wherein accounting for those time-dispersal effects and recovering information comprises adaptive equalization with channel matched filtering and sequence estimation.

5. A method as claimed in claim 1 above, wherein accounting for those time-dispersal effects and recovering information comprises adaptive equalization with channel matched filtering and maximum likelihood sequence estimation.

6. A method as claimed in claim 1 above, wherein accounting for those time-dispersal effects and recovering information comprises decision feedback equalization.

7. A method as claimed in claim 1 further comprising the step of weighting the recovered information using a scaling of that received time-dispersed signal.

8. A method as claimed in claim 7 above, wherein the soft decision information is obtained from progressively scaling over the interval of interest over which at least some of the recovered information is distributed.

9. A method as claimed in claim 1 further comprising the step of equalizing some of the time-dispersal effects before the step of weighting the recovered information.

10. A method as claimed in claim 1 above, wherein receiving comprises radio frequency reception.

11. The method of claim 1 wherein the weight is a soft decision information.

12. A method as claimed in claim 11 above, wherein the soft decision information is obtained from a partly equalized time-dispersed signal.

13. A method as claimed in claim 11 wherein the soft decision information is obtained from an absolute value of a matched filtered signal.

14. A method as claimed in claim 11 above, wherein the soft decision information is obtained from progressively scaling the soft decision information over an interval of interest.

15. A method as claimed in claim 11 above, wherein weighting comprises multiplication of the recovered information with the soft decision information.

16. A method of soft decision making comprising the steps of:
    receiving a time-dispersed signal having a time-dispersal effect,
    recovering information contained in the signal,
    and weighting the recovered information by an absolute value of the received time-dispersed signal, after the time-dispersal effect has been accounted for.

17. An apparatus for soft decision making comprising:
    means for receiving a time-dispersed signal having a time-dispersal effect, coupled with
    means for recovering information contained in the time-dispersed signal,
    and means for weighting the recovered information by using an absolute value of the time-dispersed signal, after the time-dispersal effect has been accounted for.

18. A method of soft decision making comprising the steps of:
    receiving a time-dispersed signal having a time-dispersal effect,
    recovering information contained in the time-dispersed signal,
    and multiplying the recovered information by an absolute value of the time-dispersed signal, after equalizing the time-dispersal effect.

19. A method of soft decision making comprising the steps of:
    radio reception of a time-dispersed signal,
    recovering information contained in the time-dispersed signal,
    and multiplying the recovered information by an absolute value of the time-dispersed signal, scaled over an interval over which at least part of the recovered information is distribute.

20. An apparatus for soft decision making comprising:
    means for radio reception of a time-dispersed signal, coupled with
    means for recovering information contained in the time-dispersed signal,
    and means for multiplying the covered information by an absolute value of the time-dispersed signal.

* * * * *

UNITED STATES PATENT AND TRADEMARK OFFICE
CERTIFICATE OF CORRECTION

PATENT NO. : 5,271,042
DATED : December 14, 1993
INVENTOR(S) : Gerald Labedz, David Borth, Phillip Rasky It is certified that error appears in the above-indentified patent and that said Letters Patent is hereby corrected as shown below:

Title page, item [75] Inventors:
The inventor name David F. Borth should be David E. Borth.

Column 6, line 52: "the covered information" should be "the recovered information.

Signed and Sealed this

Seventeenth Day of May, 1994

BRUCE LEHMAN

*Attest:*

*Attesting Officer*   *Commissioner of Patents and Trademarks*